United States Patent [19]

Tesch et al.

[11] Patent Number: 5,036,650
[45] Date of Patent: Aug. 6, 1991

[54] MATERIAL COLLECTION SYSTEM

[75] Inventors: Roger H. Tesch; Denis J. Del Ponte, both of Beaver Dam, Wis.

[73] Assignee: Deere & Company, Moline, Ill.

[21] Appl. No.: 559,231

[22] Filed: Jul. 27, 1990

[51] Int. Cl.⁵ .............................................. A01D 34/12
[52] U.S. Cl. ........................................ 56/16.6; 56/202
[58] Field of Search ..................... 56/13.3, 13.4, 14.3, 56/17.4, DIG. 10, 5, 16.6, 202, 205, 203

[56] References Cited

U.S. PATENT DOCUMENTS

| | | | |
|---|---|---|---|
| 4,709,541 | 12/1987 | Broman et al. | 56/202 |
| 4,711,073 | 12/1987 | Freir, Jr. et al. | 56/16.6 X |
| 4,726,178 | 2/1988 | Mallaney et al. | 56/202 |
| 4,899,525 | 2/1990 | Takei et al. | 56/202 |
| 4,926,624 | 5/1990 | Murakawa et al. | 56/202 |
| 4,932,193 | 6/1990 | Wolf | 56/16.6 |
| 4,984,420 | 1/1991 | Samejima et al. | 56/203 |

Primary Examiner—William P. Neuder

[57] ABSTRACT

A front mount mower is provided with a side-mounted material collection system including a frame which is supported on a caster wheel. A support shaft is coupled to right front wheel of the mower vehicle by means of an adapter hub held in place by the wheel mounting studs and lug nuts. A stiffener strut includes a sleeve mounted on the shaft through means of bearings which permit the shaft to rotate freely relative to the sleeve, the sleeve being welded to the forward end of a tube having its rearward end received on a pin fixed to a mounting plate bolted to the vehicle frame. The forward end of the frame of the collection system includes a member having a u-shaped collar at its forward end which is releasably secured to the sleeve by means of fasteners, this collar permitting the frame to move up and down relative to the sleeve. The working width of the vehicle equipped with the collection system is substantially the same as that of the vehicle without the collection system attached thereto.

12 Claims, 5 Drawing Sheets

MATERIAL COLLECTION SYSTEM

BACKGROUND OF THE INVENTION

1. Field of the Invention

The invention relates to material collection systems or bagging attachments for lawn mowing vehicles.

2. Description of the Related Art

Many front mount mowing vehicles having front driven wheels and at least one steerable rear wheel have been provided with material collection systems for containing the clippings that have been cut by the vehicle's mowing deck. Many such mowers carry the material collection systems behind the operator's seat. The clippings that are cut in front of the vehicle within the mower deck are propelled rearwardly around the operator through a tube and are received at the rear of the vehicle by a container. Such vehicles are very maneuverable in the forward direction since the containers are carried high on the rear of the vehicles and do not extend a great distance outwardly from the direction of travel. These containers do not significantly add to the width or length of the vehicle, and therefore the amount of space or clearance needed for the vehicle to get around a sharp turn is relatively small. Because these containers are mounted high on the rear of the vehicle the operator's view to the rear is often obstructed when traveling in the reverse direction. Also, the vehicle's center of gravity is raised since the container filled with clippings is positioned relatively high on the vehicle. Consequently, the stability of a vehicle carrying a container in such a high position is decreased when operating on side slopes. Many mowers provide containers carried low on the rear of the vehicles whereby the stability on side slopes remains substantially unaffected, however, in order to lower the containers they must be placed behind or on the side of the engine mounted at the rear of the vehicle, thereby increasing the length or width of the vehicle with the consequence that the turning radius of the vehicle is increased.

Conventional mowers have provided trailers for pulling the collection containers behind the vehicle. Many trailers are hitched to the vehicle to pivot horizontally about the hitch point when executing a turn. Since ground engaging wheels carry most of the weight of the container and trailer, the center of gravity of the vehicle is generally not affected by the trailer. However, the trailer can obstruct the operator's view when traveling in reverse, and the pivotal connection between the trailer and vehicle can make maneuvering in the reverse direction difficult.

Trailers for carrying material containers have been provided having rigid connections to the vehicle. Since the hitches are rigid, the weight of the trailer and material container together with the material located therein is transferred to the vehicle during operation and thereby changes the vehicle's center of gravity. The vehicle's stability on side slopes can therefore be adversely affected by these trailers. Some rigidly connected trailers provide caster wheels for engaging the ground beneath the trailer. These wheels act to carry a portion of the trailer's weight, but only when the wheel is in contact with the ground. Since the rigid trailers extend significantly rearwardly of the vehicle, the clearance required during execution of a turn is increased.

Another type of conventional material collection system is rigidly mounted to the side of the vehicle. Since side mounted collection systems are closer to the point of discharge of the grass from the mower deck than the rear mounted or trailer mounted containers, the distance the grass must travel is smaller. Therefore many side mounted containers do not require the attachment of a blower or other propelling mechanism for moving clippings to the container. If a propelling mechanism is provided, it can be smaller than is required when the containers are rear mounted or trailer mounted. While visibility and maneuverability to the rear is not generally affected by side mounted collection systems, when such systems are connected so as to be supported by the vehicle, the vehicle's center of gravity is caused to be shifted outwardly during operation. The vehicle is therefore less stable when traveling over a side slope. Many of these mowers provide for the attachment of weights to the side of the vehicle opposite the collection system to counteract the shifting of the center of gravity associated with the weight of the container and materials collected thereby so as to make the vehicle more stable. However, counterweights add expense to the material collection system and consume the operator's time when attaching and removing the collection system. Such side mounted collection systems do not increase the width of the rear corners of the vehicle, but often increase the overall width of the vehicle so as to require a wider clearance to maneuver.

SUMMARY OF THE INVENTION

It is therefore desirable to provide an easily attachable material collection system for a mowing vehicle that does not significantly increase the vehicle's turning radius or clearance required when turning. Visibility to the rear and maneuverability in the reverse direction should not be adversely affected by the material collector. Further, it would be desirable for such a system to be attached to the vehicle such that the weight of the collector does not significantly affect the center of gravity of the vehicle. The stability of the mower would thereby be increased for operation on uneven terrain or side slopes.

The aforementioned desired features of the invention as well as other features are enabled by a preferred embodiment of the material collection system which comprises a container which is carried by a frame that is supported in substantial part by a castered wheel mounted to an outer rear location of the frame, the frame having a pivotal connection with a support shaft forming an extension of the axle of one of the drive wheels of the vehicle. A stiffener strut is coupled between the support shaft and location of the vehicle frame which is rearward of the drive wheel so as to give rigidity the support shaft. The outer side of the container is formed by a cover which is pivotally mounted for swinging, between a lowered closed position and a raised open position, about a fore-and-aft axis aligned with an inlet opening formed in an upper inner location in the front of the container.

DESCRIPTION OF THE PREFERRED EMBODIMENT

Figure 1:
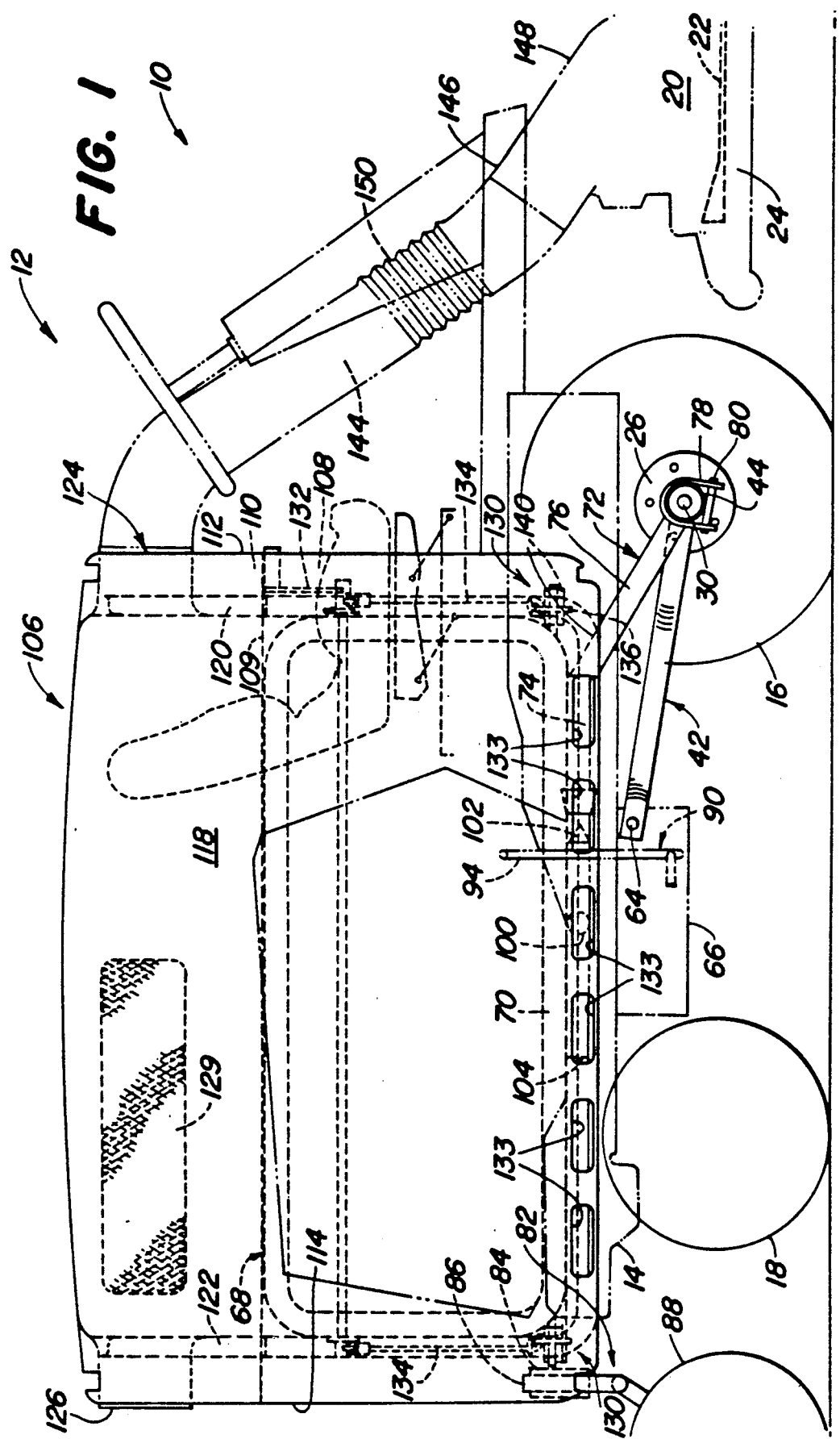
FIG. 1 is a schematic right side elevational view of a front-mount mowing vehicle together with a material collection system constructed in accordance with the principles of the present invention.

Referring now to FIG. 1, there is shown a front-mount mowing vehicle 10 to which is coupled a side-mounted material collection system 12. Specifically, the vehicle 10 comprises a fore-and-aft extending main frame 14 supported on a front pair of drive wheels 16 and a rear pair of steerable wheels 18. Coupled to the forward end of the main frame 14, as by appropriate lift arms (not shown) in a conventional manner is a mower unit 20 including a plurality of cutting blades 22 which are located beneath a blade housing 24 and operate to deliver clippings to a discharge opening provided in the left-hand side of the housing 24.

Figure 2:
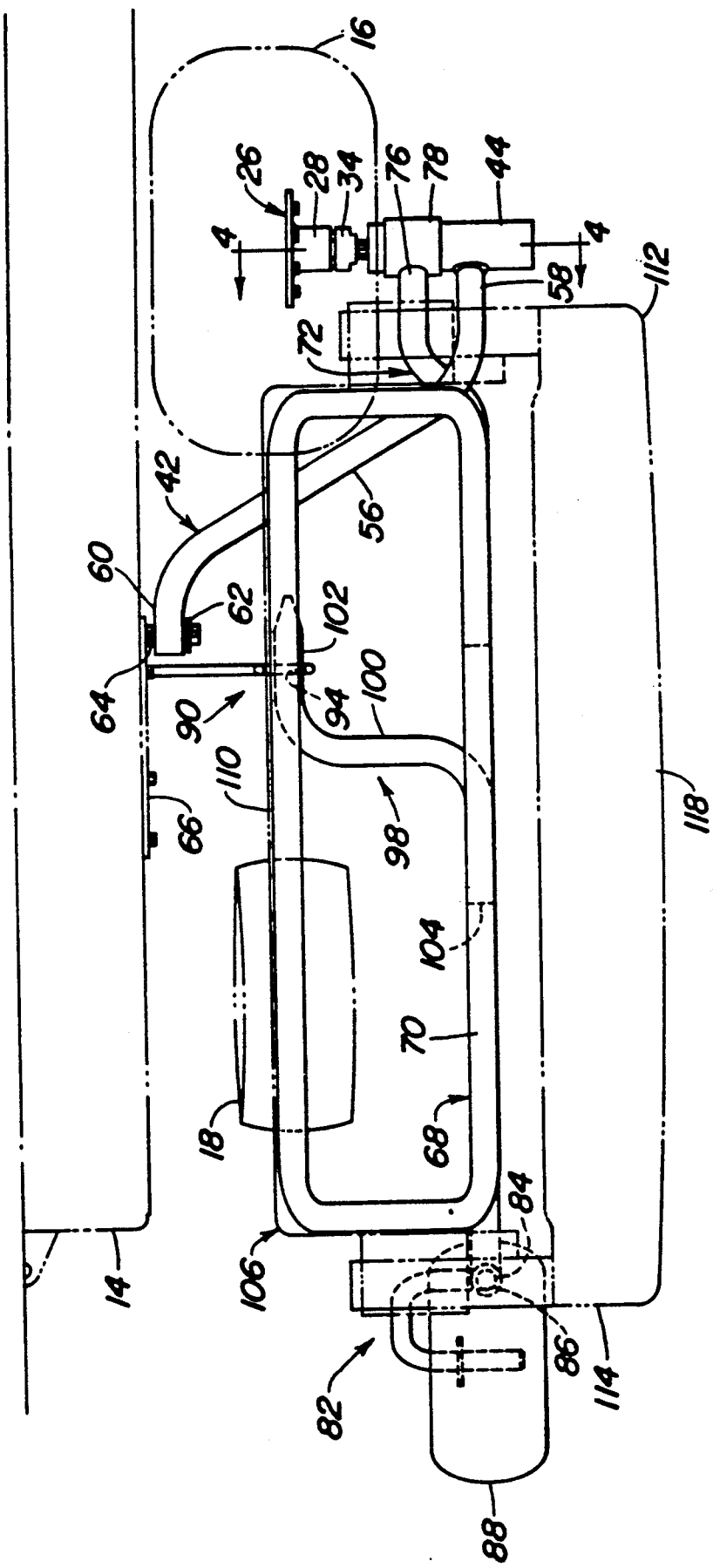
FIG. 2 is a partial top plan view of the vehicle and material collection system shown in FIG. I, with the material collection container depicted in dotted lines.
Figure 4:
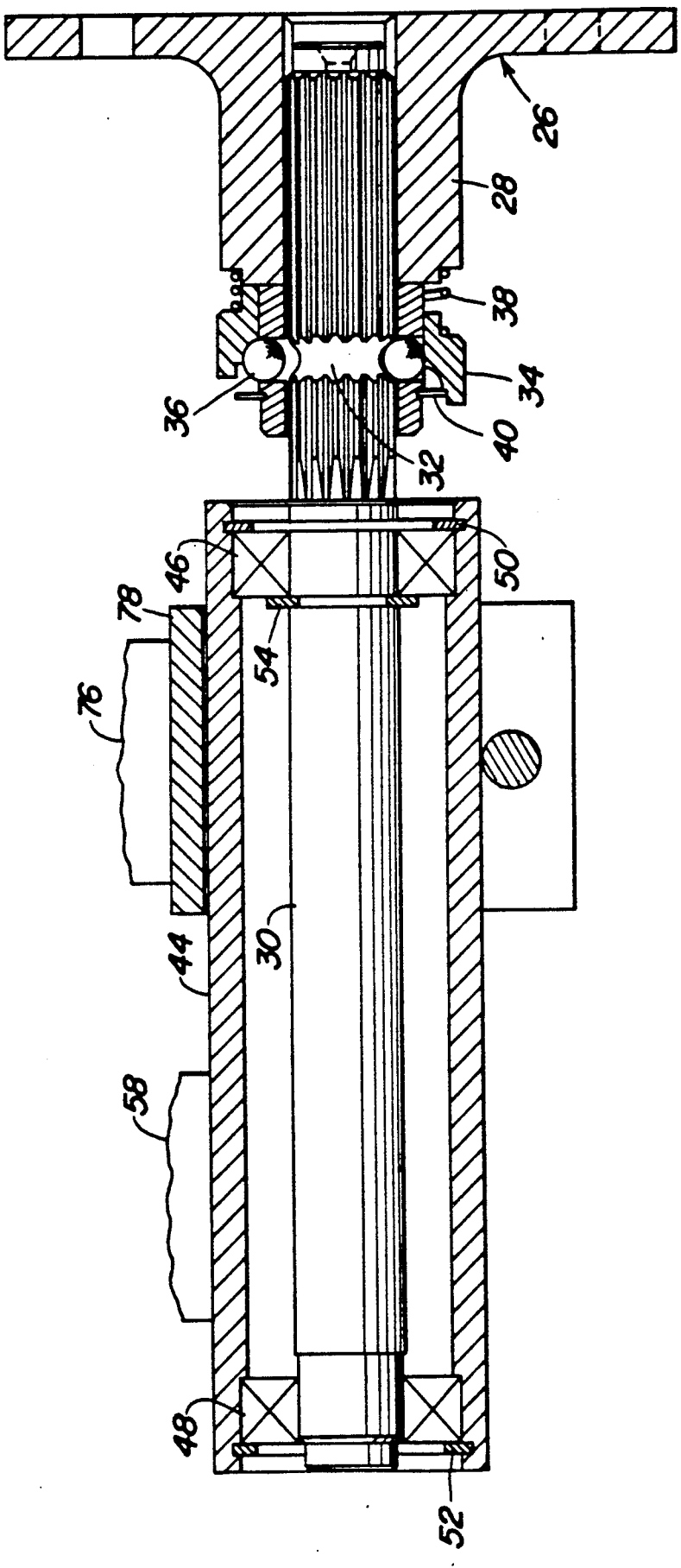
FIG. 4 is a vertical sectional view along line 4—4 of FIG. 2 and taken through the shaft and hub therefor which is adapted for connection to the vehicle front wheel for providing a hitch point for the material collection system.

The material collection system 12 includes an adapter hub 26 received on studs which mount the right front drive wheel 16 to the drive axle therefor, the hub 26 being held in place by the wheel lug nuts. The hub 26 includes an outward tubular projection 28 (see FIGS. 2 and 4) having splines interiorly thereof and received in the projection 28 is the splined inner end of a support shaft 30. As can best be seen in FIG. 4, the splined end of the shaft 30 is provided with an annular detent ball groove 32 and received on the end of the hub 26 is a connection collar 34 which releasably retains a pair of detent balls 36 within the groove 32, the collar being biased, as by a spring 38, to a latching position against a snap ring 40 located in a groove provided in the outer portion of the hub 26.

The collection system 12 further includes a tubular stiffener frame or strut 42 having a forward end defined by a transverse sleeve 44 which is swivelly mounted on the support shaft 30 by inner and outer roller bearings 46 and 48, respectively, having respective outer races received in inner and outer recesses formed within the interior of the sleeve 44, the outer races being held against shoulders formed by the recesses by inner and outer snap rings 50 and 52 located in respective grooves spaced from the shoulders. The assembled sleeve 44 and bearings 46 and 48 are held in place on the shaft 30 by a snap ring 54 received in a groove provided in the shaft 30 and engaged with the outer face of the inner race of the inner bearing 46.

The strut 42 further includes a section 56 extending rearwardly and upwardly from the sleeve 44 and including a fore-and-aft extending front end portion 58 welded to an outer location of the sleeve 44 and joined to a fore-and-aft extending rear end portion 60 by an intermediate portion 56 which extends inwardly from the front end portion (see FIG. 2), the rear end portion 60 fixedly receiving a transverse, tubular mounting receptacle 62 which is received on a pin 64 welded to a plate 66 bolted to the right side of the vehicle frame 14. Thus, the stiffener strut 42 rigidifies the support shaft 30 so as to resist any tendency of the latter to deflect rearwardly during operation.

Figure 3:
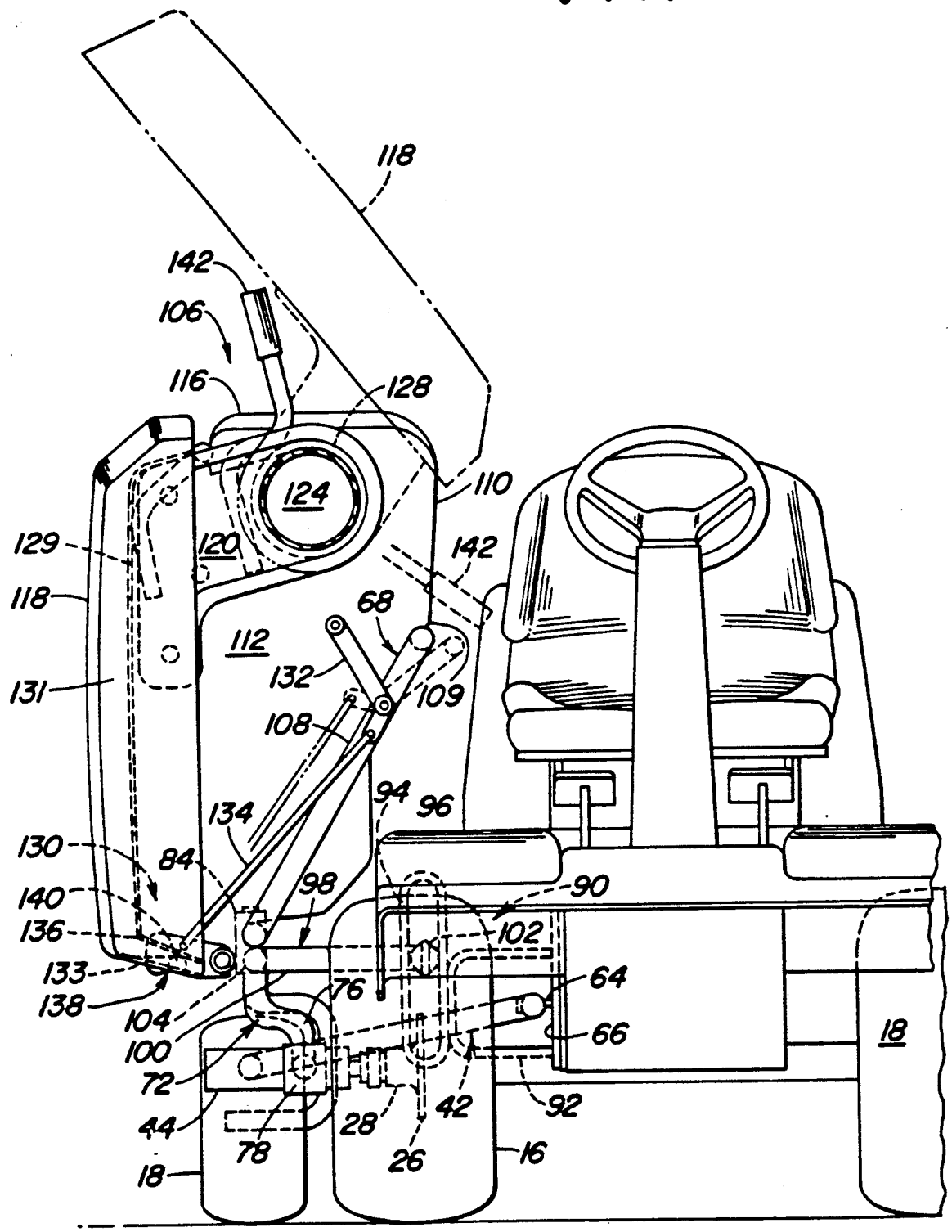
FIG. 3 is a partial front elevational of the vehicle and material collection system shown in FIG. 1 but with the cover latch mechanism being shown and the mowing apparatus being removed.

The material collection system 12 further includes a collection container support frame 68 having a central rectangular section 70, which inclines upwardly and inwardly as viewed in FIG. 3, a forward hitch section 72 having a horizontal portion 74 (FIG. 1), which is welded to a forward portion of the bottom of the rectangular section 70, and a forward portion 76 which inclines downwardly from the section 70 and has its forward terminal end offset inwardly from its rear terminal end and welded to a u-shaped collar 78 which is received on an inner location of the strut sleeve 44 and releasably held in place by a pair of fasteners 80, the collar 78 being dimensioned such that it swivels freely on the sleeve 44.

Welded to the rear end of the bottom of the rectangular section 70 is a caster wheel mount 82 including a vertical sleeve 84 having a spindle 86 of a caster wheel 88 swivelly mounted therein in a manner well known in the art. Thus, it will be appreciated that as the vehicle 10 moves over uneven ground or obstacles, such as curbs or the like, the frame 68 will move up and down pivoting about its connection with the strut sleeve 44. This movement is limited by means of a bumper structure 90 which includes the plate 66, an inner ushaped rod section 92 having legs projecting transversely and provided with inner bent ends welded to the plate 66, and an outer rectangular rod section 94 which is elongated vertically and oriented so as to define a fore-and-aft guide opening 96. The rod section 94 has a medial portion of its inner side welded to the base member of the u-shaped rod section 92.

A horizontally oriented tubular bumper element 98 has a transversely extending intermediate portion 100 joined to a forwardly extending end portion 102, the end portion 102 being received in the guide opening 96 of rectangular rod section 94. It further has a rearwardly extending outer end portion 104 that is welded to a central underside portion of the bottom of the rectangular frame section 70. It will be appreciated then that the outer rod section 94 of the bumper structure 90 will be contacted by the inner end portion 102 of the bumper element 98 so as to limit upward and downward movement of the container support frame 68 about the strut sleeve 44 and will also limit any tendency of the container frame 68 to move inwardly or outwardly relative to the vehicle 10.

Figure 5:
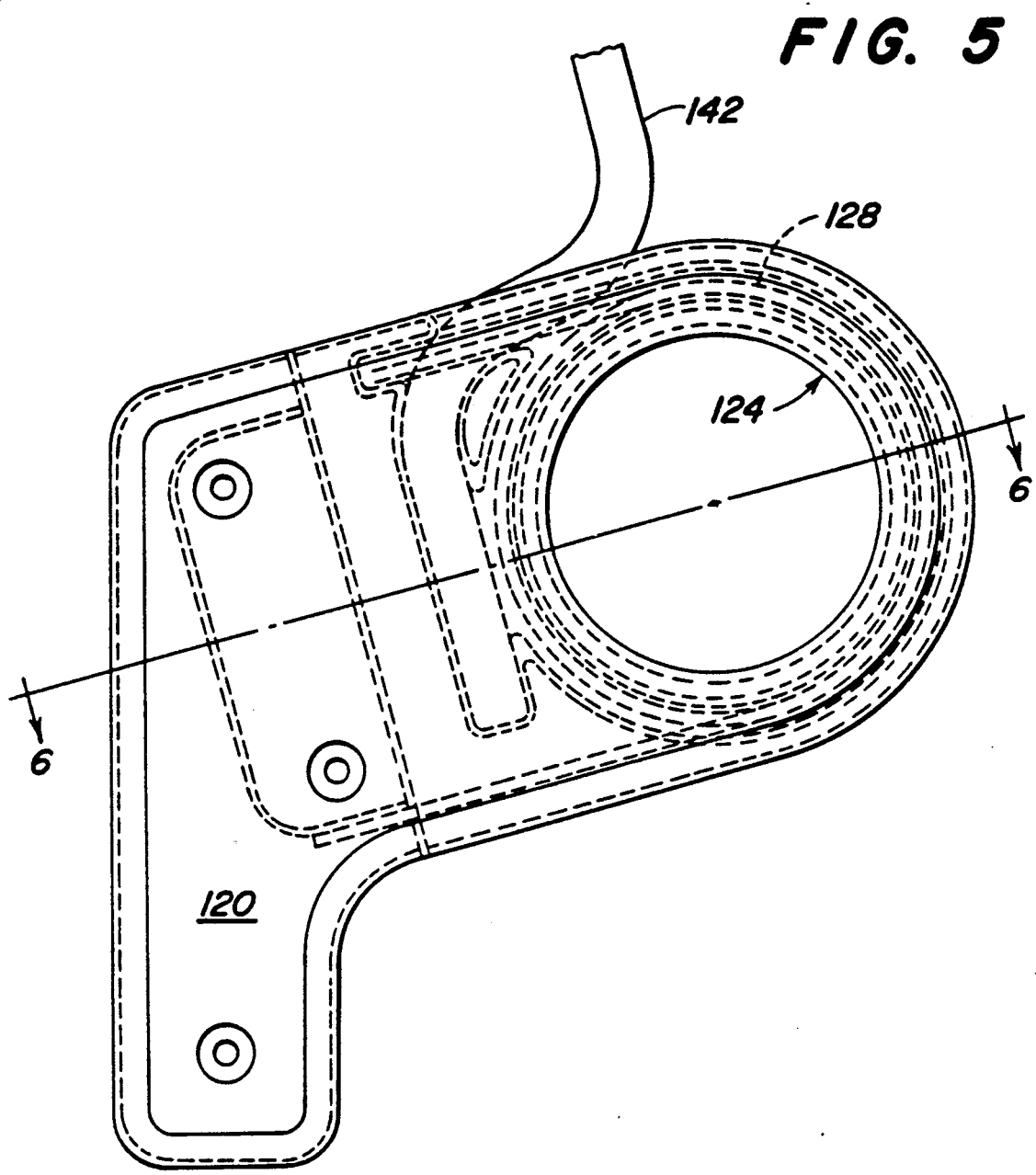
FIG. 5 elevational view of the forward arm portion of the cover which forms a portion of the pivotal connection of the cover to the remainder of the receptacle.
Figure 6:
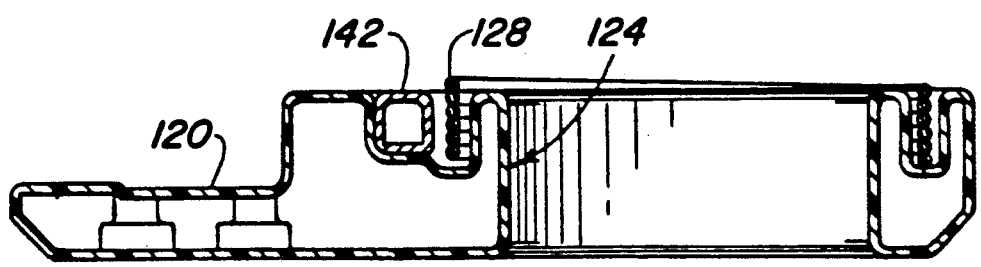
FIG. 6 is a view taken along line 6—6 of FIG. 5.

Mounted to the rectangular frame section 70 is a material collection container 106 having an upwardly and inwardly inclined bottom wall 108, as viewed in FIG. 3, engaging the frame section 70 and having its upper end joined at 109 to an upright inner wall 110 and its front and rear ends respectively joined to upright front and rear walls 112 and 114, respectively (see also FIG. 1). A substantially horizontal top wall 116 is joined to the tops of the side wall 110 and the front and rear walls 112 and 114 with these joined walls cooperating to define an enclosure having and open outer side. This open outer side of the enclosure is adapted to be selectively closed by an upright side door 118 having front and rear pivot arms 120 and 122, respectively, joined to upper front and rear locations thereof. The upper inner portion of the front arm 120 includes a cylindrical opening which is received over a forwardly projection tubular clipping inlet 124 provided at the upper inner portion of the front wall 112. Similarly, the upper inner portion of the rear arm 122 is provided with a cylindrical projection 126 which also serves as a pivot support for the door 118. The door 118 is mounted for pivoting between a lowered closed position, as can best be seen in solid lines in FIG. 3, and a raised dashed line position also appearing in FIG. 3. Each of the pivot arms 120 and 122 embodies a coil spring 128 (see FIGS. 5 and 6) having its opposite ends respectively fixed in place in the arm and to either the front or rear wall 112 or 114 whereby the springs 128 assist the operator in opening and holding open the door 118. Provided in the top portion of the inside surface of the door 118 is a screened air outlet 129. Air introduced into the container 106 through inlet 124 can be exhausted through the double walled door 118 by entering the opening 129, passing through the space 131 between the double walls of the door 118 and out the slots 133 provided in the lower and outer wall of the door.

The door 118 is positively retained in its closed position by means of a door latch mechanism 130 including a latching hand lever 132 pivotally mounted to the forward end of the frame section 70 and joined to an upper end of a latch rod 134 having its lower end attached to latch plate 136 which is pivotally mounted to a lower outer location of the front wall 112 and is provided with a receptacle 138 releasably engaged with a latch pin 140 carried at a lower inner location of the door 118. Once the door 118 is unlatched, it may be swung to its raised open position through means of a lift handle 142 which is secured within the front pivot arm 120, the handle 142 thus being located for easy manipulation by a seated operator.

A material delivery tube 144 is connected between a rearwardly directed tubular outlet 146 of a clipping directing discharge chute 148 secured to the right end of the mower blade housing 24 and the tubular inlet 124 of the container 106, it being noted that the tube 144 includes a flexible intermediate section 150 which permits the tube to move up and down with the container 106.

The front mount mower 10 is readied for operation with the material collection system 12 by initially connecting the latter to the vehicle. This is done by bolting the plate 66, which carries the pin 64 and the bumper structure 90, to the vehicle main frame 14. Also, the lug nuts of the right front wheel 16 are removed and the adapter hub 26 is placed over the wheel studs and the lug nuts reinstalled. The support shaft 30 is then installed in the hub 26 by inserting the splined end thereof into the hub 26 and fixing it in place by manipulating the connection collar 34 so as to move the detent balls 36 into the ball groove 32. The stiffener strut 42 is then installed by placing the sleeve 44, together with the bearings 46 and 48, over the support shaft 30 and inserting the inner snap ring 50 so as to hold the sleeve 44 in place and at the same time, placing the tubular receptacle 62 over the pin 64. The container support frame 68 is then rolled into place with the inner end portion 102 of the bumper element 98 being inserted into the guide opening 96 defined by the outer rectangular rod section 94 of the bumper structure 90. The u-shaped collar 78 is then fastened onto the sleeve 44. Lastly, the discharge chute 148 is connected to the mower blade housing 24 and the material delivery tube 144 is connected between the outlet 146 of the chute 148 and the inlet 124 of the material collection container 106. It will be appreciated then that when it is desired to operate the vehicle without collecting clippings discharged from the mower that only the last two steps mentioned above need to be reversed in order to ready the vehicle for such operation. While the support shaft 30 and stiffener strut 42 will remain attached to the vehicle 10, these elements will not likely interfere with the operation of the mower and their presence will make readying the vehicle for picking up cut material a very quick and simple operation.

Next, the operation of the preferred embodiment will be discussed. During forward travel, the front right wheel 16 of the vehicle is rotating, and the adapter hub 26 which is bolted to the wheel is rotating therewith. Consequently, the shaft 30 is caused to rotate within the inner and outer bearings 46 and 48 held within the sleeve 44. As the vehicle 10 moves forwardly, the frame 68 of the collection system 12 is pulled forwardly by the support shaft 30.

The weight of the frame 68 and the container 106 is carried by the caster wheel 88, which is positioned rearwardly of the center of gravity of the frame 68 and container 106. When mowing operations begin, the material collector container 106 will be empty. Grass and other material entering the container will be deposited at the back of the container 106, thereby making the back of the container heavier than the front. In this situation, the center of gravity of the material collection system is shifted towards the caster wheel 88 so that the latter bears most of the weight, i.e., very little of the weight being borne by the support shaft 30. This situation is desirable from the standpoint of vehicle operation since the additional weight will not have much influence on the maneuverability of the vehicle. As the container 106 fills with grass and gets heavier, the center of gravity will shift forwardly to add more weight to the right forward drive wheel 16 of the vehicle. However, since this location is low, the additional weight will again have minimal effect on the stability and maneuverability of the vehicle when it is operated over slopes or rough terrain, for example.

When operating the vehicle 10 on uneven or bumpy terrain, the coupling of the frame 68 to the sleeve 44 permits the frame 68 to pivot up and down relative to the vehicle. Specifically, when the caster wheel 88 encounters a bump, the caster wheel will ride over the bump and the frame will pivot upwardly about the connection with the sleeve 44 and hence about the support shaft 30. The frame 68 therefore shifts upwardly independent of the vehicle in order to accommodate bumps. The center of gravity of the vehicle 10 thus remains unaffected by the material collector system 12 when operating over uneven terrain and the stability of the vehicle remains substantially unaffected.

As the caster wheel 88 encounters irregular ground conditions such as side slopes, the frame 68 may have a tendency to pivot with respect to the vehicle in a horizontal plane. In order to prevent the frame from shifting toward or away from the vehicle in such situations, the inner end portion 102 of the bumper element 98 is positioned within the rectangular guide loop formed by the outer rectangular rod section 94 of the bumper structure 90. As the frame shifts laterally, the bumper element end portion 102 engages the vertically extending portions of the rod section 94 so as to prevent excessive lateral shifting of the frame 68 which might otherwise bring the frame into contact or interference with the vehicle. The bumper structure 90 and the bumper element 98 also cooperate to prevent excessive vertical movement of the frame 68 relative to the vehicle 10 which ensures that the material delivery tube 144 will not undergo undue flexure which will either pull it loose from the container 106 or impede the flow of material therethrough. Such operation of the bumper element and structure being especially important when the vehicle is climbing a curb, for example.

The collection system 10 is located to the side of the vehicle 10 such that the operator's view to the rear is not obstructed when traveling in reverse. During forward operation of the vehicle, the collector frame 68 is located close to the side of the vehicle such that it will be traveling directly behind the right side of most mower decks attachable to the vehicle. Therefore, the material collector system does not significantly increase the width of the vehicle as it does not extend out from the vehicle farther than the right side of the mower deck. Further, since the material collector system 12 is located to the side of the vehicle, it adds less length to the rear corner of the vehicle than collector systems mounted to the rear of the vehicle. Therefore, the clearance required to make a turn is minimized. Also, since the container is positioned along side of the vehicle, the distance clippings must travel from the mower to the container is less than if the container were carried at the rear of the vehicle. Therefore, the size of blower required to move clippings into the container is reduced.

When the container 106 requires emptying, such can easily be done by an operator seated on the vehicle by simply unlatching the door 118 by manipulating the hand latch lever 132 and then by lifting the door to its open position by pulling on the lift handle 142. Material located in the container 106 will then simply graVitate to the ground at a location beside the path of travel of the vehicle and attached collector system whereby such emptying may be done without having to go through extensive maneuvering of the vehicle.

Thus, in summary it will be appreciated that the preferred embodiment of the present invention provides a mechanism for quickly and easily attaching a material collection system to a powered vehicle such as a riding mower. The use of the vehicle's wheel hub for attaching the collector frame to the vehicle provides an already existing, low location which minimizes the effect that the weight of the gathered clippings might otherwise have on the stability and maneuverability of the vehicle. Further, the invention provides for good visibility to the rear, as well as good maneuverability during operation in reverse. Operation over rough, uneven terrain is accommodated by the vertical pivoting of the frame about the connection with the wheel hub. Additionally, the side location of the mounting of the collector system makes it easy to dump accumulated clippings since the operator does not have to perform extensive maneuvering of the vehicle at the dump site.

We claim:

1. In combination with a vehicle equipped with a mower and including a fore-and-aft frame supported on front and rear wheels, a material collection system comprising:
   a container support frame;
   a container carried by the support frame;
   a caster wheel coupled to the support frame;
   a support shaft coupled to one of the front wheels;
   means vertically swivelly coupling a forward end portion of said support frame to said support shaft whereby said support frame is mounted for moving up and down as said caster wheel moves over uneven terrain or obstacles; and
   material conveying means coupled between the mower and the container for effecting movement of cut material from the mower to the container.

2. The invention defined in claim 1 wherein said vehicle is a front mount mower having a certain working width and the material collection system being dimensioned and disposed so as to operate substantially within said working width.

3. The invention of claim 1 wherein the caster wheel is positioned rearwardly of the center of gravity of the frame and material container.

4. The invention of claim 1 wherein said container includes a bottom wall which inclines downwardly and outwardly relative to the vehicle and includes an outer side wall defined by a vertically swingable door, whereby opening of the door when mowed material is located in the container results in the material falling to the ground outwardly of the container.

5. The invention of claim 1, wherein:
   said one of the front wheels of the vehicle includes a wheel hub which rotates with the wheel and is held in place by wheel lug nuts engaged with studs extending through said wheel hub;
   an adapter hub being received on at least some of the wheel lugs and being held in place by associated ones of the wheel lug nuts, the adapter hub including an outwardly extending tubular projection having a splined interior; and
   said support shaft including a splined end received in said tubular projection.

6. The invention of claim 5, and further comprising:
   a stiffener strut having a rearward end secured to the vehicle frame and a forward end defined by a transverse sleeve received about said support shaft; and
   bearings being positioned within said tube for rotatably receiving the shaft.

7. The invention of claim 6, wherein said means for swively coupling includes a collar forming a forward end of said container support frame and being releasably secured for movement about said sleeve.

8. .The invention of claim 7 wherein said collar is ushaped and is held in place by fasteners extending therethrough exclusive of said sleeve whereby said frame may be easily detached from the vehicle when the collection of cut material is not desired.

9. The invention of claim 1 and further including bumper means coupled between the vehicle frame and said container support frame for restricting sideways movement of the frame.

10. The invention of claim 9 wherein said bumper means includes a bumper structure fixed to the vehicle frame and defining a fore-and-aft guide opening and a bumper element fixed to said container frame and including a fore-and-aft extending portion located within said guide opening.

11. In a material collection system adapted for being coupled in side-by-side relationship with a mowing vehicle for collecting clippings and other material discharged from a housing of the mower, an improved container comprising:
   front, rear, bottom and inner side walls joined together to define an outwardly opening enclosure, with said bottom wall being inclined downwardly and outwardly from a bottom end of the inner side wall;
   a door being pivotally mounted to said front and rear walls for pivoting about a generally horizontal axis between a lowered closed position wherein it in effect forms an outer wall of said enclosure and a raised open position for permitting contained materials to slide out of said enclosure; and means for releasably retaining said door in its closed position.

12. The invention defined in claim 11 wherein the front wall of said container includes a tubular material inlet and said door being mounted for rotation about said inlet.

* * * * *